March 12, 1963 YONEZO IMAMURA 3,080,616
METHOD OF MAKING FIBER-CLAD STORAGE BATTERY PLATES
Filed Aug. 8, 1960 2 Sheets-Sheet 2

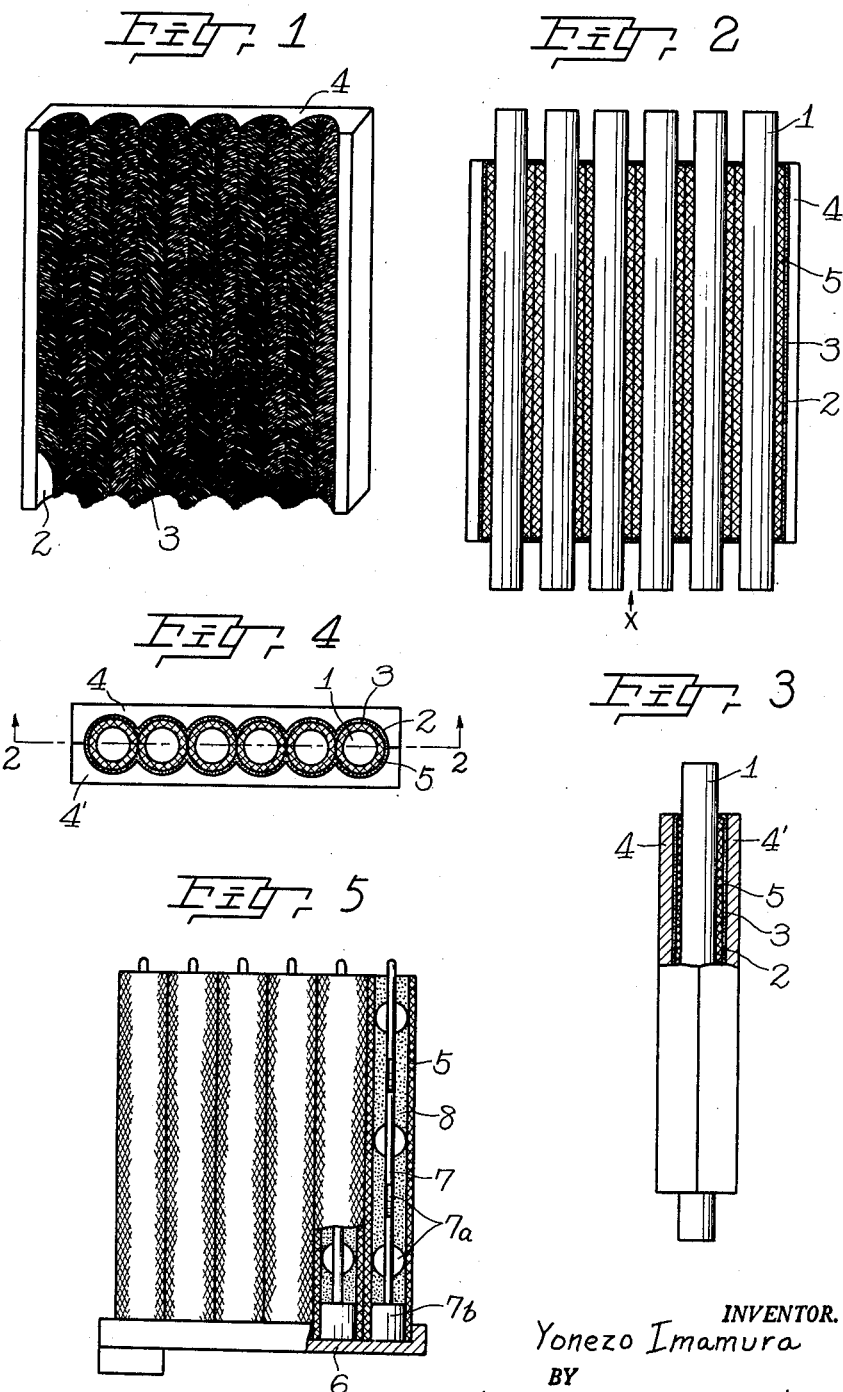

INVENTOR.
Yonezo Imamura
BY
Pierce, Schiffler & Parker
Attorneys 3,080,616
METHOD OF MAKING FIBER-CLAD STORAGE
BATTERY PLATES
Yonezo Imamura, 156 Takoyacho, Fuyacho Higashi-iru, Takoyakushi-dori, Nakagyo-ku, Kyoto, Japan
Filed Aug. 8, 1960, Ser. No. 48,099
Claims priority, application Japan Sept. 8, 1959
4 Claims. (Cl. 18—59)

The present invention relates to an improved method of manufacturing storage battery plates of the fiber-clad type.

A conventional method of manufacturing fiber-clad storage battery plates is to arrange a plurality of tubes made of woven glass fibers preferably in a row, the tubes being contiguous to each other, each of the tubes having a grid rod made from a lead alloy inserted therein in spaced relation to the inner wall of the tube, and then filling the space between the grid rod and inner wall of the tube with suitable active material and simultaneously vibrating the tube so as to pack the active material therein. A principal difficulty in this method of preparing fiber-clad storage battery plates stems from the fact that the tube woven from glass fibers has an inherent fragility and brittleness and is subject to collapse when subjected to the mechanical vibration. In order to prevent collapse of the tube wall, it has already been proposed to reinforce it by permanently incorporating, i.e. impregnating, a synthetic resin binder into the glass fibers which constitute the tube wall, care being taken, however, not to reduce the porosity factor of the tube wall any more than is absolutely necessary. Another known expedient for reinforcing the tube wall is to temporarily impregnate a binder such as starch or gelatin into the glass fibers which constitute the tube wall, the binder being harmless to the electrolyte and soluble in the electrolyte or in water, and then endeavor to remove the binder after the tubes have been filled with the active material by washing it in warm water or the like. However, both of these known expedients for preventing collapse of the woven fiber tube have disadvantages. The disadvantage of permanently impregnating the glass fiber tube wall with a synthetic resin binder is that it is most difficult to maintain an adequately high porosity factor in the wall. The disadvantage of temporarily impregnating the glass fiber tube wall with a soluble binder such as starch or gelatin is that it is most difficult to wash out all of the binder after it has hardened thus likewise reducing the porosity factor of the tube wall.

A principal object of this invention is to provide an improved method of manufacturing fiber-clad storage battery plates which makes it easy for the active material to be introduced into the glass fiber tubes by virtue of the fact that the tube walls are maintained against collapse during the filling and vibration step without the necessity for impregnating the tube wall with a binder thereby assuring maximum porosity of the tube wall after the assembly of the plate has been completed.

Another object of the invention is to provide an improved method of manufacturing fiber-clad storage battery plates which is more simplified and cheaper than has heretofore been possible, and which is also more satisfactory in terms of performance of the plates after being put into operation.

Another object of the invention is to provide an improved method of making fiber-clad storage battery plates of the type comprising a plurality of fiber tubes, each such tube having a grid rod inserted therein and a filling of active material, and which includes a step, preliminary to filling, of supporting the fiber tubes snugly in mold cavities lined with short fibers which penetrate and effect an interlock with the fibers from which the fiber tubes are made. This pressure induced inter-engagement between the fibers of the mold cavities and the fibers of the tubes serves to support the tubes against collapse during the filling and vibrating phase.

The novel method involved in the manufacture of fiber-clad type storage battery plates resides in the following procedure. A split mold is provided which comprises two mating mold halves, and each mold half includes a plurality of identical parallel, vertically extending arcuate and contiguous grooves which are lined with short fibers, the grooves in the respective mold halves being arranged in confronting, mating relation such that when the mold halves are brought together, there will be formed in the mold a plurality of identical parallel, vertically extending, fiber lined essentially cylindrical cavities. Also provided is a cylindrical mandrel or rod for each of these essentially cylindrical cavities. The mandrel is preferably made from metal having a smooth external surface in order to enable it to be inserted in the fiber tube and removed without difficulty.

A cylindrical tube made from a porous fabric of acid-proof fibers, such as glass fibers, having an outer diameter slightly less than the diameter of the circle represented by two confronting fiber lined arcuate grooves in the mold, and an inner diameter substantially equal to the external diameter of the mandrel, is inserted in each groove of one of the mold halves and a mandrel is inserted in each of the fiber tubes. Preferably, the mold construction is such that when the fiber tubes are assembled in their respective cavities in the mold, the walls of adjacent tubes will be contiguous to each other. The mold is then closed by bringing the mold halves together whereupon the fiber tubes will be finally shaped to the configuration defined by the mold cavities, and an intimate, non-slipping contact established by pressure between the short fibers which constitute the mold cavity lining and the fibers in the exterior wall surface of the fiber tubes due to the penetrating effect of the short fibers as the mold is closed. All of the mandrels are then pulled out. A grid rod is then inserted into the center of each fiber tube from the bottom thereof, and the tubes are then filled with active material from the top during which filling the mold is preferably vibrated in order to compact the filling material in the tubes. Conveniently, the grid rods may be carried by an upper rim, the rods being arranged in an upstanding manner on the rim in parallel spaced relation, the distance between adjacent rods being, of course, equal to the distance between the centers of adjacent fibers tubes.

The fibers which line the mold cavities are short, preferably of the order of 0.2 mm. to 0.25 mm. in length, and are caused to adhere on end to the surface of the arcuate grooves in the mold halves by means of a strong binder. The fibers may be "planted" on the surface of the grooves either by mechanical means or by an electrical technique.

The foregoing objects and advantages of the invention will become more apparent from the following description of one practical embodiment thereof and from the accompanying drawings which illustrate the same. In these drawings:

FIG. 1 is a view in perspective of the inner surface of one of the mold halves showing the parallel-spaced arcuate and contiguous grooves which are lined with the short fibers in order to establish a positive frictional grip, by penetration, with the outer surfaces of the fiber tubes which are inserted therein.

FIG. 2 is a vertical central section taken on line 2—2 of FIG. 4 with certain parts thereof shown in elevation;

FIG. 3 is an end elevation of the complete assembly of the split mold, mandrels and fiber tubes with a part thereof in section;

FIG. 4 is a bottom plan view of the complete mold assembly as viewed in the direction of the arrow in FIG. 2; and FIG. 5 is a view in side elevation of the assembly of fiber tubes arranged in side-by-side, contiguous relation, with a part of the tube wall broken away to show the interior thereof including the grid rod and active material.

Figure 6:
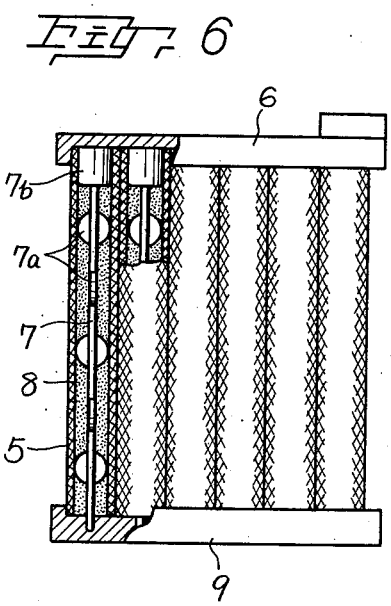
FIG. 6 is a view in side elevation of the complete plate, with a part of the tube wall broken away to show the interior thereof including the grid rod and active material.

With reference now to the drawings, the mandrels or bars for shaping the fiber tubes are indicated by numeral 1. These mandrels 1 are cylindrical and have an outside diameter substantially equal to the internal diameter of the fiber tubes 5. The mandrels are referably made from a metal having a smooth exterior surface for the purpose of facilitating insertion and removal of the mandrels from the fiber tubes 5. The fiber tubes are made by weaving acid-proof fibers such as glass fibers. The two-part split mold comprises mold halves 4 and 4' and each mold half includes a plurality of vertically extending arcuate grooves which approach a semi-circular configuration and wherein adjacent grooves are contiguous to each other. These grooves are provided with a fiber liner 3 which is composed of a mass of fibers of short length, for example, from 0.2 mm. to 0.25 mm. in length and are caused to adhere on end to the surface of the grooves by means of a strong binder. The fibers may be erected, i.e. "planted" on the groove surfaces mechanically or by an electrical technique.

In carrying out the invention, a mandrel 1 is inserted into each of a cylindrical fibre tube 5, then each of the fibre tubes is placed in each of the fibre lined grooves in one of the mold halves, it being noted from FIG. 2 that the mandrels 1 are longer than the tubes 5 and mold halves 4, 4' so as to project outwardly from the bottom as well as the top of the mold. The mold is then closed by bringing the mold halves 4, 4' together and securing the mold in its closed position by suitable clamping means, not illustrated. It will be noted from FIG. 4 that the arcuate grooves in the mold halves bear such a relation to the external diameter of the fiber tubes 5 that adjacent tubes 5 are contiguous to each other in the mold and that the mandrels 1 completely fill the interior of the fiber tubes. Also, when the mold halves are brought together, the fiber tubes 5 will be given a final pressure shaping by the confronting arcuate grooves and their external surfaces will be penetrated due to the mold pressure by the short fibers which form the mold cavity liner 3 thus preventing any possible relative longitudinal displacement between the fiber tubes and mold grooves when the mandrels are pulled out and when the mold is thereafter vibrated during the tube filling operation.

The next step in the method is to pull out all of the mandrels 1 leaving the fiber tubes fixed in the mold cavities and to insert a grid rod 7 made from a lead alloy centrally into each of the tubes 5, the insertion being made from the bottom of the tubes. Spacer discs 7a having a diameter substantially equal to the internal diameter of the tube 5 are arranged in longitudinally spaced relation along each grid rod 7 and adjacent spacer discs 7a are disposed in mutually perpendicular planes so as to keep each rod 7 centered along the longitudinal axis of its associated tube.

The lower end of each grid rod 7 terminates in a cylindrical foot 7b having an external diameter substantially equal to the internal diameter of the tube 5 so as to close off the bottom of the tube.

Conveniently, all of the grid rods 7 may be united by their foot portions 7b to an upper rim 6 so as to facilitate their insertion simultaneously into their respectively associated fiber tubes 5.

Next, the mold containing the assembly of fiber tubes 5 and grid rods 7 is vibrated and filled simultaneously with the active material 8 through the upper, open ends of the tubes. As is known, the vibration serves to pack the active material into the tubes. After the tubes have been filled with active material, those parts of the grid rods 7 projecting out of the fiber tubes 5 are welded to the lower rim 9 with lead, thus a fiber clad type storage battery will be obtained. Such plates are then subjected to the known formation treatment and are assembled as a storage battery.

As explained above, due to the mold pressure, the short fibers planted within the grooves of the mold halves pierce the woven fabric meshes of the periphery of the fiber tubes and hold the latter in a positive manner against longitudinal displacement while the vibration and filling are taking place. Also, the interlock between the fiber liner 3 and the fibers of the tubes 5 prevents any deformation and possible breakage of the tubes 5 during the vibration and filling phase.

Thus, in conclusion, the present invention eliminates the necessity for incorporating any binder into the wall of the fiber tubes which had been necessitated by prior known methods of filling the fiber tubes in order to prevent their collapse and hence obviously eliminates the step previously required to remove such binder after the tubes have been filled. Also, since no binder is required, optimum porosity of the tube is always assured. The technique disclosed by the present invention is therefore considerably simplified as compared with prior known techniques and the production cost is correspondingly lowered, and one also obtains a superior final product. Moreover, the improved technique lends itself especially applicable to the mass production of fiber-clad storage battery plates.

I claim:

1. In the method of making fiber-clad storage battery plates of the type comprising a plurality of fiber tubes made from a porous fabric of acid-proof fibers, each said tube having a grid rod inserted therein and a filling of active material, the preliminary step which includes supporting said tubes in pressure contact with complementary configured walls of a split mold, said mold walls being lined with short fibers, and wherein due to mold pressure effected by closing of the mold the short fibers are caused to penetrate and interlock with the fibers of said fiber tubes.

2. The method of making fiber-clad storage battery plates as defined in claim 1 and which is further characterized by the fact that each of said fiber tubes includes a mandrel temporarily inserted therein prior to closing of the split mold and which is removed subsequently to closing of the split mold.

3. The method of making fiber-clad storage battery plates as defined in claim 1 and which includes the further step of vibrating the assembly of the closed split mold and fiber tubes during the filling of said tubes with active material.

4. The method of making fiber-clad storage battery plates as defined in claim 1 wherein said grid rods are carried in parallel spaced relation on a common supporting member and are inserted simultaneously into their respective fiber tubes subsequently to closing of the split mold.

References Cited in the file of this patent

UNITED STATES PATENTS

| | | |
|---|---|---|
| 1,101,968 | Smith | June 30, 1914 |
| 1,153,172 | Robinson | Sept. 7, 1915 |
| 2,451,934 | Evans | Oct. 19, 1948 |
| 2,715,004 | Fox | Aug. 9, 1955 |
| 2,831,510 | Carter | Apr. 22, 1958 |
| 2,896,006 | Sundberg | July 21, 1959 |

FOREIGN PATENTS

| | | |
|---|---|---|
| 547,365 | Great Britain | Aug. 25, 1942 |